(12) United States Patent
Mortimer et al.

(10) Patent No.: US 9,607,491 B1
(45) Date of Patent: Mar. 28, 2017

(54) APPARATUS FOR GENERATING A VIBRATIONAL STIMULUS USING A PLANAR RECIPROCATING ACTUATOR

(71) Applicants: Bruce J. P. Mortimer, Casselberry, FL (US); Gary A. Zets, Casselberry, FL (US); Anthony C. Morcos, Casselberry, FL (US)

(72) Inventors: Bruce J. P. Mortimer, Casselberry, FL (US); Gary A. Zets, Casselberry, FL (US); Anthony C. Morcos, Casselberry, FL (US)

( * ) Notice: Subject to any disclaimer, the term of this patent is extended or adjusted under 35 U.S.C. 154(b) by 0 days.

(21) Appl. No.: 14/490,636

(22) Filed: Sep. 18, 2014

Related U.S. Application Data

(60) Provisional application No. 61/879,504, filed on Sep. 18, 2013.

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC ............ H02K 33/16; G08B 6/00; G06F 3/016
USPC ....................................... 340/407.1; 318/114
See application file for complete search history.

(56) References Cited

U.S. PATENT DOCUMENTS

| | | | | |
|---|---|---|---|---|
| 5,736,797 A | * | 4/1998 | Motohashi | H02K 33/16 310/36 |
| 6,098,288 A | * | 8/2000 | Miyagawa | B26B 19/282 30/210 |
| 6,441,571 B1 | | 8/2002 | Ibuki et al. | |
| 6,777,895 B2 | * | 8/2004 | Shimoda | H02K 33/16 318/114 |
| 6,979,164 B2 | * | 12/2005 | Kramer | B25J 13/02 340/407.1 |
| 7,798,982 B2 | | 9/2010 | Zets et al. | |
| 7,924,145 B2 | * | 4/2011 | Yuk | G06F 3/03547 340/407.1 |
| 8,040,223 B2 | | 10/2011 | Mortimer et al. | |
| 2003/0036678 A1 | * | 2/2003 | Abbassi | A61H 19/50 600/38 |
| 2006/0097857 A1 | * | 5/2006 | Osaka | B60Q 9/006 340/435 |
| 2007/0106457 A1 | * | 5/2007 | Rosenberg | G01C 17/00 701/532 |
| 2011/0074559 A1 | * | 3/2011 | Pfau | G06F 3/016 340/407.1 |
| 2012/0223824 A1 | * | 9/2012 | Rothkopf | G06F 3/016 340/407.1 |
| 2013/0314220 A1 | * | 11/2013 | Colgate | G06F 3/016 340/407.1 |

* cited by examiner

*Primary Examiner* — Albert Wong
(74) *Attorney, Agent, or Firm* — Larry D. Johnson

(57) ABSTRACT

A planar reciprocating actuator (PRA) provides a linear motor configured and optimized for small displacement and oscillation, and can use the effect of a designed mechanical or magnetic spring to increase the amplitude of displacement at certain operating points. The PRA is intended to be used in vibrotactile and haptic applications. The PRA can generate various types of vibratory characteristics that may be perceived as distinct and readily user-identifiable haptic stimuli.

20 Claims, 9 Drawing Sheets

APPARATUS FOR GENERATING A VIBRATIONAL STIMULUS USING A PLANAR RECIPROCATING ACTUATOR

CROSS REFERENCE TO RELATED APPLICATIONS

The present application claims the benefit of the filing date of U.S. Provisional Patent Application Ser. No. 61/879,504, filed Sep. 18, 2013. The foregoing application is incorporated by reference in its entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to vibrators, transducers, and associated apparatus, and more specifically to an improved method and apparatus for generating a vibrational stimulus using a planar reciprocating actuator.

BACKGROUND INFORMATION AND DISCUSSION OF RELATED ART

The sense of touch is not typically used as a man-machine communication channel, however, it is as acute and in some instances as important as the senses of sight and sound, and can be intuitively interpreted. Tactile stimuli provide a silent and invisible, yet reliable and easily interpreted communication channel. Information can be transferred in various ways including force, pressure and frequency dependent mechanical stimulus from an electrical actuator. Broadly, this field is also known as haptics.

There is a general need for a low cost, compact actuator assembly that can convey a strong vibrotactile sensation (stimulus) to the body. These devices should be small, lightweight, efficient, electrically and mechanically safe and reliable in harsh environments, and drive circuitry should be compatible with standard communication protocols to allow simple interfacing with various avionics and other systems.

A single vibrotactile transducer can be used to convey information to the user. For example, a simple alert may be used to draw the attention of the user to and external cue such as an incoming cell phone call. Additional information can be conveyed by modulating the vibrotactile signal parameters (see for example Brewster, S. A. and Brown, L. M. Tactons: Structured Tactile Messages for Non-Visual Information Display. In *Proceedings of Australasian User Interface Conference* 2004 (Dunedin, New Zealand), Australian Computer Society, p. 15-23). For example, a single actuator can provide information regarding the cue such as the urgency of the incoming cell phone call. Many human system interfaces, for example a computer interface device, allow some form of haptic feedback to the user.

A plurality of vibrotactile transducers can, in other applications, be used to provide more detailed information, such as spatial orientation of the person relative to some external reference. Using an intuitive body-referenced organization of vibrotactile stimuli, information can be communicated to a user. Such vibrotactile displays have been shown to reduce perceived workload by its ease in interpretation and intuitive nature (see for example: Rupert A H, 2000, Tactile Situation Awareness System: Proprioceptive Prostheses for Sensory Deficiencies. Aviation, Space, and Environmental Medicine, Vol. 71(9):II, p. A92-A99).

The sensitivity of the body's skin (body) receptors to vibrational displacement is well known (see for example Bolanowski, S., Gescheider, G., Verrillo, R., and Checkosky, C. (1988). "Four channels mediate the mechanical aspects of touch", J. Acoust. Soc. Am., 84(5), 1680-1694, and; Bolanowski, S., Gescheider, G., and Verrillo, R. (1994). "Hairy skin: psychophysical channels and their physiological substrates", Somatosensory and Motor Research, 11(3), 279-290). Three receptor systems thought to contribute to detection of vibrotactile stimuli at threshold under normal conditions—Pacinian corpuscles (Pc), Meissner's corpuscles, and Merkel's disks. Of these, the Pacinian corpuscles are the most sensitive. At 250 Hz, the sensitivity of the human skin (body) to displacement is less than 1 μm (Pc).

Mechanotransduction is the process by which displacement is converted into action potentials. Pc receptors (or similar receptors located in non-glaborous skin) are located relatively deeply within the skin (body) structure. In this range, the human perception of vibration depends primarily on mechanical contactor displacement, and is most sensitive to displacement that is normal to the skin (body) surface (as opposed to tangential or shear). Pc receptors also show an effect known as special summation where there is a reduction in detection threshold as a function of the contact area. Such a mechanism has been explained as the addition of energy from larger and larger areas of stimulation.

The study of haptics and the effect of mechanical and/or vibrational stimuli on the human skin (body) has been the subject of ongoing research (see for example 2 L. A. Jones and N. B. Sarter, "Tactile displays: Guidance for their design and application," Hum. Factors 50, 90-111 2008, and H. Tan and A. Pentland, "Tactual displays for wearable computing", Personal Technologies, Vol 1, pp 225-230, 1997). Many types of wearable actuators suitable for providing a vibrotactile (tactile) stimulus to the body of a user have been developed. There are several different potential mechanisms for converting electrical signals into mechanical stimuli. For example, electromagnetic, magnetorestrictive, piezoelectric, dielectric elastomers, shape memory materials and pneumatic actuators have been proposed. The selection of actuation mechanism is based on size, frequency response, form factor, mass, actuation force, efficiency, reliability and cost. Typically only piezoelectric, dielectric elastomers and electromagnetic actuators are chosen for wearable applications. Of these, electromagnetic actuation is usually the most cost effective choice as it can be compatible with low voltage driver circuitry.

Prior vibrotactile transducer designs have incorporated electromagnetic devices based on a voice coil designs, electrical solenoids, or a variable reluctance designs. For example, linear resonant actuators (LRA) comprise of a moving coil, mass and an internal spring and are used to provide a high frequency vibration. However, LRAs are high Q resonant devices and are prone to the effects of loading due to their low force. Another common approach is to use a small electromagnetic motor with an eccentric mass (EM) rotating on the shaft, such as is used in pagers and cellular phones. A common shortcoming of these previous design approaches is that the transducers are somewhat large compared to wearable electronics, are rapidly damped when operated against the body and have operating rise times that are slower than what is required to excite the Pc (or Pc like) corpuscles.

Pager motors, or eccentric mass EM motors, are usually constructed with a DC electric motor with an eccentric mass load such as half-circular cylinder that is mounted onto the motor's shaft. The motor is designed to rotate the shaft and its off-center (eccentric) mass load at various speeds. From the conservation of angular momentum, the eccentric mass imparts momentum to the motor shaft and consequently the motor housing. The angular momentum imparted to the motor housing will depend on the mounting of the motor housing, the total mass of the motor, the mass of the eccentric rotating mass, the radius of the center of mass from the shaft and the rotational velocity. In steady state, the angular momentum imparted to the housing will result in three dimensional motion and a complex orbit that will depend on the length of the motor, the mounting geometry, the length of the shaft and center of gravity of the moving masses (see for example J. L. Meriam, Engineering Mechanics: Dynamics, SI Version, 5th Edition, 2003, Wiley). This implementation applies forces in a continually changing direction confined to a plane of rotation of the mass. Thus the resultant motion of the motor housing is three dimensional and complex. If this motion is translated to an adjacent body, we may interpret the complex vibration (and perceived vibrational stimulus) to be diffuse and a "wobble" sensation.

The rpm of the EM motor defines the tactile frequency stimulus and is typically in the range of 30-150 Hz. Typically these devices are intended to operate at a single (relatively low) frequency, and cannot be optimized for operating over the frequency range where the skin (body) of the human body is most sensitive to vibrational stimuli (see for example Verrillo R. T. (1992) "Vibration Sensation in Humans", Music Perception, Vol 9, No 3, pp 281-302). It may be possible to increase the vibrational frequency on some EM motors by increasing the speed of the motor (for example by increasing the applied voltage to a DC motor). However, there are practical limits to this as the force imparted to the bearing increases with rotational velocity and the motor windings are designed to support a maximum current. It should also be apparent that the angular momentum and therefore the eccentric motor vibrational output also increases with rotational velocity.

The temporal resolution of EM motors is limited by the start up time (also referred to as spin-up or rise-time), which can be relatively long, on the order of 100 ms or so. The spin-up time depends on the eccentric load, the motor torque speed characteristics and also the start voltage applied to the motor. Spin-up times greater, or comparable to, the skin (body)'s temporal resolution can limit data rates. If the vibrotactile feedback is combined with other sensory feedback such as visual or audio, the spin-up time delay has the potential of introducing disorientation. The slow spin-up time needed to achieve a desired rotational velocity is due the acceleration and deceleration of the spinning mass.

There are two important effects associated with the practical operation of EM motors as vibrotacile transducers. Firstly the motion that is translated to an adjacent body will depend on the loading on the motor housing—from the conservation of momentum, the greater the mass loading on the motor (or transducer housing) the lower the vibrational velocity and perceived amplitude stimulus. Secondly, from the conservation of momentum, if the mass loading on the motor is changed, the torque on the motor and angular rotation rate will also change. In fact it is not possible to simultaneously and independently control output vibration level and frequency.

LRA actuators can be designed to operate with reasonably high frequencies (for example 250 Hz), However, their operating bandwidth is very narrow which complicates drive circuitry (often requiring resonance tracking circuitry which is well known in the art). The displacement and force output from LRA's is relatively low and can be deleteriously affected by skin loading effects on the actuator or on the housing containing the actuator. Therefore this class of actuator may be suitable for hand held haptic and tactile devices, but are usually not effective when the device is in contact or worn over other less sensitive areas of the body.

There is a general need for haptic and tactile capability in a wide range of wearable devices such as activity trackers (exercise monitors), cell phones, intelligent watches, navigation devices, augmented reality display devices, user interfaces, medical devices, system interfaces, smart clothing and the like. There is further a need for haptic and tactile actuators that are simultaneously capable of fast rise times, high output displacement and a miniature actuator form factor that is compatible with low voltage electronics.

The foregoing information reflects the current state of the art of which the present inventor is aware. Reference to, and discussion of, this information is intended to aid in discharging Applicant's acknowledged duty of candor in disclosing information that may be relevant to the examination of claims to the present invention. However, it is respectfully submitted that none of the above information discloses, teaches, suggests, shows, or otherwise renders obvious, either singly or when considered in combination, the invention described and claimed herein.

SUMMARY OF THE INVENTION

The apparatus for generating a vibrational stimulus of the present invention provides a novel implementation of a linear motor configured and optimized for small displacement and oscillation, which we have termed the planar reciprocating actuator (PRA). The PRA is suitable for producing small displacements and can use the effect of a designed mechanical or magnetic spring to increase the force, amplitude of displacement and response at certain operating points. The PRA is intended to be used in vibrotactile and haptic applications. The PRA can generate various types of vibratory characteristics that may be perceived as distinct and readily user-identifiable haptic stimuli. Preferably, the PRA actuator rise time should be less than 50 ms and provide a peak device displacement of at least 200 micrometers as measured on the surface of the device. Examples of haptic stimuli include tone bursts with burst durations of between 5 and 600 ms, impulses of between 2 and 100 ms in duration and directional impulses where the displacement is primarily along an axis of the device. The haptic stimuli may be created using oscillatory shaped waveforms, comprising at least one peak within the waveform and may require techniques for the control of actuator ringing (ring-down). In certain embodiments the PRA may combine with component parts of the wearable device. Wearable devices comprise of a broad range of electronic components that are typically worn on the body of a user, or held by the user. The PRA should be miniature, efficient and should ideally deliver a high amplitude displacement vibratory pulse to the body of the user in response to an electrical drive signal.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. Further the following description may describe any combination of spring and/or bearing as a suspension mechanism.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1A:
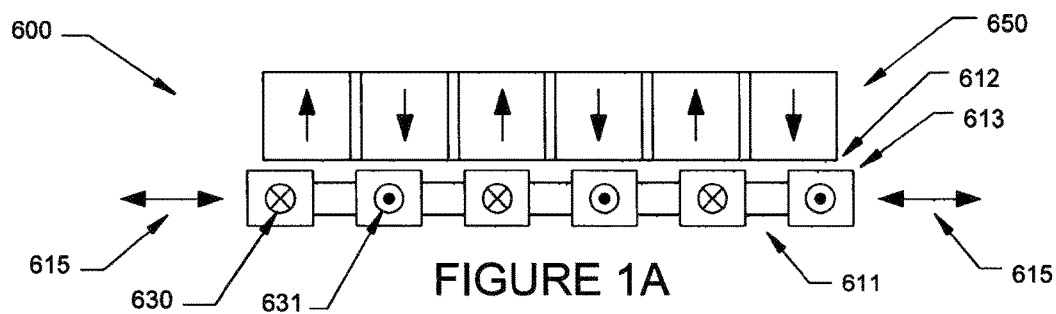
FIGS. 1A-1D show prior art linear motor coil and magnet configurations.

Referring to FIGS. 1A through 12, wherein like reference numerals refer to like components in the various views, there is illustrated therein a new and improved apparatus for generating a vibrational stimulus using a planar reciprocating actuator (PRA).

The PRA is based on the design of an electromagnetic linear motor. A linear motor can be thought of as a rotary motor with the rotor and stator unwrapped; so a typical configuration may be a series of permanent magnets mounted in a linear fashion adjacent to multiple coils, also arranged in a linear fashion. Either the coils or magnets are mounted on a moving element so that they are free to move when the coils are energized—giving rise to a moving coil configuration (i.e. where the coils move) or a moving magnet configuration (i.e. where the magnet moves).

The design objective for most linear motors is to achieve significant displacement with sufficient force to move a load, while maintaining linearity and positioning accuracy. Most linear motors must be able to displace the moving element over a significant range. To achieve this, designs usually utilize multiple electrical motor rotor and stator elements positioned in a linear "track". The motor and track would contain a bearing, slider or suspension mechanism for positioning the moving element from the track and associated stator.

One common design issue is cogging, which is the "force ripple" that results from the magnetic attraction between the discrete rotor and stator elements. In general, cogging can be more significant in higher energy density, iron core motors, which will typically include permeable material to direct the field to where it is most effective. Another design consideration is the requirement for a linear bearing to support the load, especially as depending on the magnetic design, there may be significant attractive forces between the stator and rotor, although magnetic levitation can also be employed.

Little attention has been paid to using electromagnetic linear motor mechanisms for small displacement, reciprocating actuators. Such miniature actuator configurations would be suitable for a wide range of applications where a compact, flat form factor is required. Such miniature actuator configurations would also be suitable for use as a vibrotactile or haptic transducer as described hereinafter. Specifically, with small displacement where high force and acceleration are the key parameters, one would not necessarily be concerned with non linearity and cogging. In fact, it may be possible to use those feature to enhance the performance. The linear motor is well suited to a planar (flat, rectangular) form factor since it allows most of the volume to be utilized by active components (magnet, coil) potentially allowing the configuration of an actuator with a high energy density.

FIGS. 1A-1D show various details of prior art linear motor embodiments. FIG. 1A sectional view 600 shows a magnet array assembly 650 separated from a series of one or more planar coil windings 611 by a small air gap 612. In linear motor designs, either the magnet array 650 or the coil assembly 611 can be the moving element depending on the requirements and physical construction. In this view the planar coil windings 611 and its associated assembly is designed to be the moving element, moving laterally in the axial direction 615 shown (depending on the coil current and magnetic field interaction according to well known electromotive laws) while the magnet array 650 remain fixed.

An external voltage supply together with associated motor control electronic circuitry (well known in the art) is used to create a current in the planar coil windings 611. The direction of the current is determined by the coil layout and the external supply. For example, winding current 630 may be into the page while winding current 631 may be out of the page in the section view 600. The winding currents (for example 630 and 631) produce a magnetic field that interacts with the magnetic field from the magnet array (especially in the air gap 612 and planar coil windings 611) according to known electromotive laws. The interaction may also be additive; combining the effect of several magnet and coil windings according to known prior art. The resultant electromotive force between the moving element and the non-moving element will act to potentially move the selected moving element in a lateral direction 615. The movement direction can also be reversed by changing the direction of the current in the planar coil windings 611 using said external voltage supply and electronic motor control circuitry.

As described hereinbefore, either the magnet array 610 or the coil assembly 611 can be the moving element. In prior art, the stationary element is generally termed the stator and the moving element termed the rotor. The stator is usually fixed to a larger mass, or ground reference, while the rotor (or moving element) is usually designed to be lightweight (especially in applications where rapid movements are required).

Figure 1B:
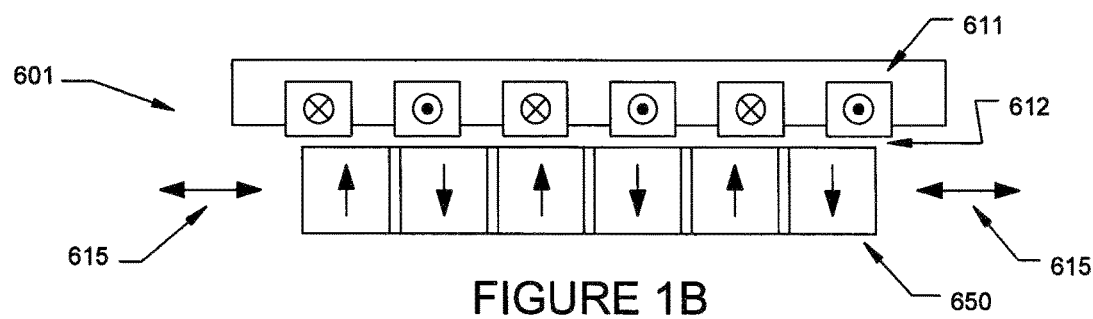

FIG. 1B view 601 shows a similar linear motor configuration to the view shown in FIG. 1A, however in this view the magnetic assembly 650 is designed to be the moving element, moving laterally in the direction 615 shown (depending on the coil current and magnetic field interaction according to well known electromotive laws) while the planar coil windings 611 remain fixed.

Figure 1C:
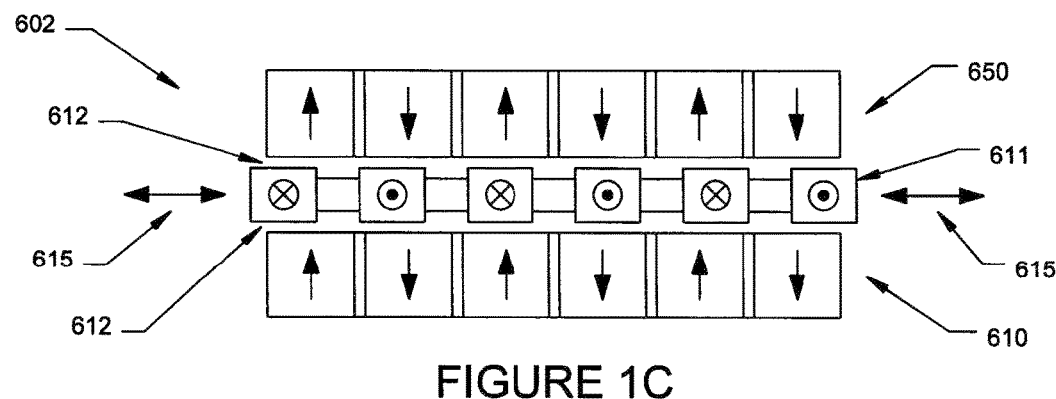

FIG. 1C view 602 shows another prior art linear motor configuration, but with two magnet array assemblies 610 and 650 positioned on either side of the planar coil assembly 611, each separated from the coil by small air gaps 612 (i.e. the planar coil assembly 611 is "sandwiched" between two magnet arrays 610 and 650). The magnet assemblies 610 and 650 are designed and positioned relative to each so as to maximize the magnetic flux density within the air gap 612.

The magnet arrays 610 and 650, or the coil assembly 611, can be the moving element in a linear motor design. However, in this configuration, it is mechanically easier to have the coil assembly 611 as the moving element as there will be strong attractive forces between the two magnetic arrays 610 and 650 which will have to be managed with an external fixture.

Figure 1D:
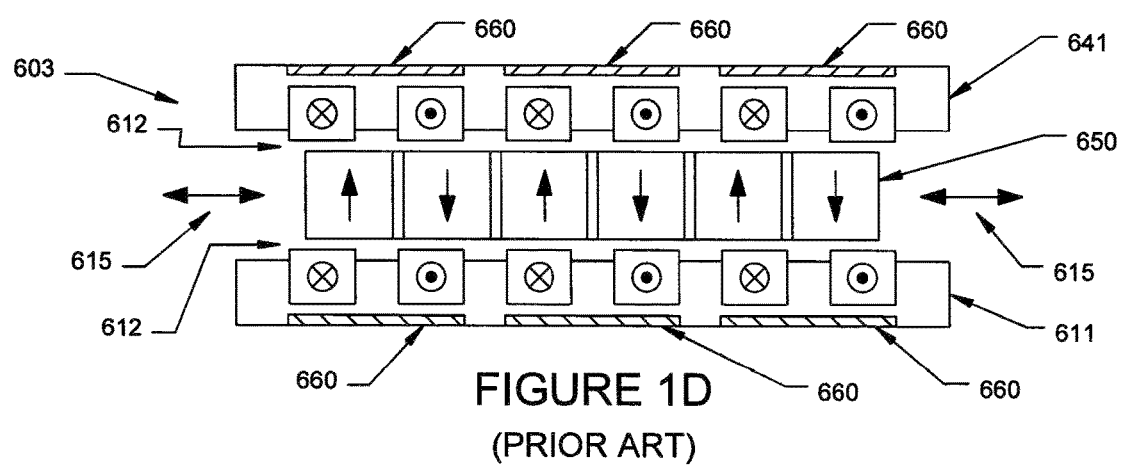

FIG. 1D view 603 shows another alternate embodiment of a linear motor where the two planar coil assemblies 611 and 641 are mounted on either side of the moving magnet array 650. The coil assemblies 611 and 641 are separated from the magnet array 650 by two small air gaps 612. The magnet array 650 or the planar coil assemblies 611 and 641 can be the moving element in this linear motor design. However, in this configuration, it is mechanically easier to have the magnet assembly 650 as the moving element. It may also be desirable to include coil backing magnetically permeable elements 660 to shape and contain the magnetic field produced by planar coil assemblies 611 and 641, and the magnet array 650.

Linear bearings, guides, suspension means and the like (not shown) are used in all linear motor embodiments to maintain the air gap 612 and prevent the stator and rotor from any direct contact, while allowing motion in the preferred direction of movement.

Figure 2:
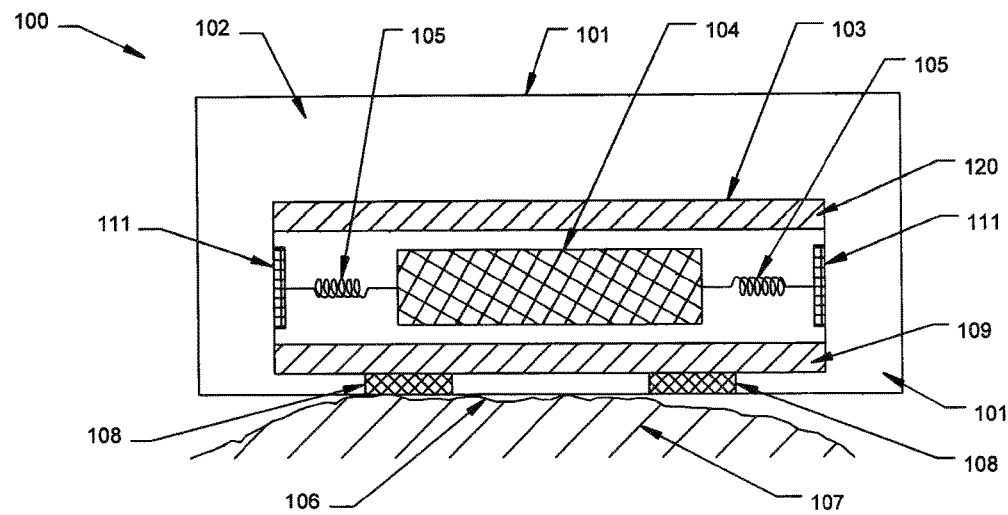
FIG. 2 shows the general concepts in the planar reciprocating actuator (PRA) for use in a wearable device to produce tactile or haptic stimuli on the body of a user who is in contact with said device.

FIG. 2 shows a sectional diagram 100 of the primary components of a first embodiment of this invention which is intended to be used in vibrotactile and haptic applications. In this embodiment, a planar reciprocating actuator (PRA) component 103, described in detail hereinafter, is contained within 102 a housing or wearable device 101 that may be worn, or is intended to be in contact with a user. The wearable device may contain other components not related to the PRA, for example, a cell phone may contain circuitry, display and other hardware for utility and use in other applications. The wearable device may also contain associated electronic motor driver circuitry, computers, sensors, batteries and user interface hardware that can be used to actuate the PRA in a vibrotactile and haptic task, for example, user tactile cueing, tactile and haptic feedback and the like. The wearable device 101 will therefore have at least a portion of one side 106 of the device housing in contact with the skin or body of the user 107. The contact between the device and the user may also contain intermediate layers such as clothing and the like.

The PRA comprises of a motional component or moving mass 104 and at least one stator 109. The PRA 103 motional component 104 may be preferably attached using one or more mechanical springs 105 that may also act as a support and guide. In some embodiments, the mass of the motional component 104 may be mechanically resonant with the combination of one or more springs 105.

In other embodiments, one or more springs 105 attached to said motional component 104, are connected through additional compliant end mounts 111 that are mounted between said springs and the PRA 103 stator 109. The compliant end mounts are optional and may be used to impart damping to the moving element. In further embodiments of this invention, additional compliant mounting components 108 are attached between the PRA 103 and the wearable device 101 housing wall or structure.

The PRA uses a linear motor configuration to produce reciprocating motion in a motional component 104. The stator 109 could be a magnet array and the motional component 104 a coil winding (or series of coil windings), or in other embodiments, the stator 109 may be a coil (or series of coils) and the motional component a magnet array. In either case, magnetically permeable elements may be added to shape and contain the magnetic field. In other embodiments, the stator 109 and 120 could be two magnet array elements and the motional component 104 a coil winding (or series of coil windings), or in other embodiments, the stator 109 and 103 may be a coil (or series of coils) and the motional component a magnet array.

Preferably the moving mass of the PRA may be part of the linear motor and may in some embodiments, also include part of the wearable or hand-held device components as described hereinafter. The displacement of the moving mass is intended to be primarily within the linear motor. The PRA moving mass is constrained to move primarily in a linear trajectory with a guiding mechanism that may also comprise of springs and damping elements that are used to control the mechanical resonance and response characteristics of the actuator. The motional component 104 reciprocating displacement also produces reaction forces and potentially motion of the PRA stator. The reaction forces on the stator transfer to acceleration and oscillation of the complete wearable device 101. The oscillation of the wearable device is intended to be used in vibrotactile and haptic applications. Therefore the vibratory oscillation is usually only for short durations (less than 1000 ms) so as to avoid well known sensory receptor adaptation effects and at an oscillation rate and frequency range for which the skin has known sensitivity (for example 30 to 300 Hz).

In other embodiments an additional stator 120 may be combined with the stator 109, each stator component positioned on each side of the motional component 104 in a "sandwich" construction and configured so as to increase the electromotive capabilities of the actuator. In each embodiment, the motional components and stator components contain magnetic circuit components for use as a reciprocating linear motor.

Figure 3A:
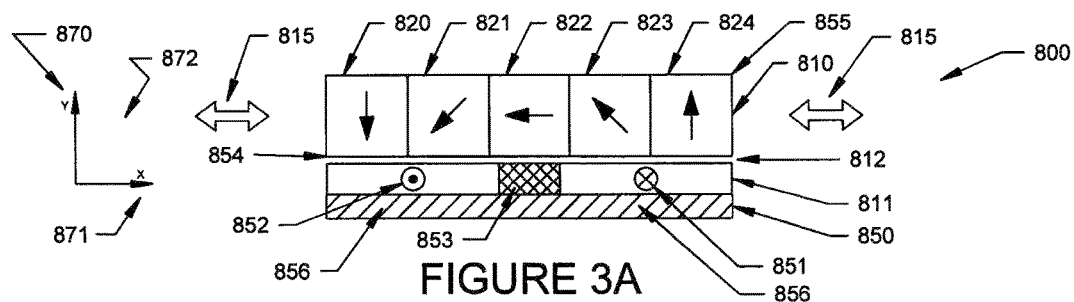
FIGS. 3A-3C show further details of the linear motor and components used in the PRA.

FIG. 3A shows a sectional view 800 and details of a preferred embodiment of components of the PRA utilizing a Halbach magnetic array (Klaus Halbach, Nuclear Instr. & Meth., p. 169, 1980). A Halbach array is a special arrangement of permanent magnets that augments the magnetic field on one side of the array 854 while cancelling the field to near zero on the other side 855 thereby potentially improving the electromotive capability in a linear motor configuration. This is achieved by having a spatially rotating pattern of magnetization over the length of the magnet array 810. For example, magnet segments 824, 823, 822, 821, and 820 make up a magnet array 810, with each element having a magnetic orientation rotated approximately 45 degrees from its neighbor. This magnet configuration directs most of the magnetic flux density downward through the planar coil windings 851 and 852, with very little flux leaking outward away from the coil. The winding 811 may be constructed using a racetrack winding (coils wound with two parallel winding sections and two end turn windings), or combinations of interleaved windings.

Note that a five segment Halbach magnet array 810 has been shown in these examples. However, Halbach arrays can be readily constructed with fewer or more segments, and with alternative magnetic orientations in the array. The Halbach magnet array 810 may comprise of individual magnet elements that have been magnetized with various orientations and then bonded together. The preferred permanent magnet materials for the magnet assembly are anisotropic sintered NdFeB, anisotropic sintered SmCo and anisotropic sintered ceramic ferrite. Such materials have the high intrinsic coercive (Hci) required to allow for such a magnetic circuit. A single magnet can replace the plurality of magnets for the magnet array assembly, but the magnet material must be isotropic (e.g., isotropic bonded NdFeB). The single-piece magnet array can then be magnetized in-situ with Halbach orientation according to methods known in the art.

Figure 3B:
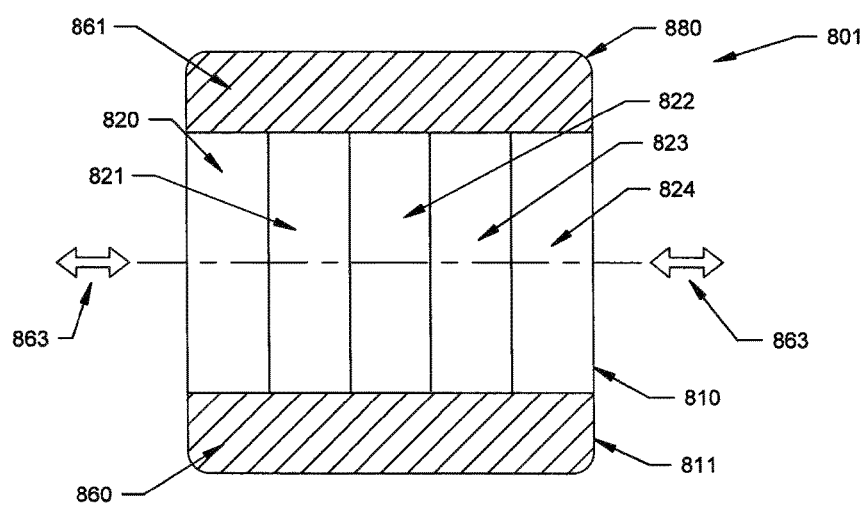
Figure 3C:
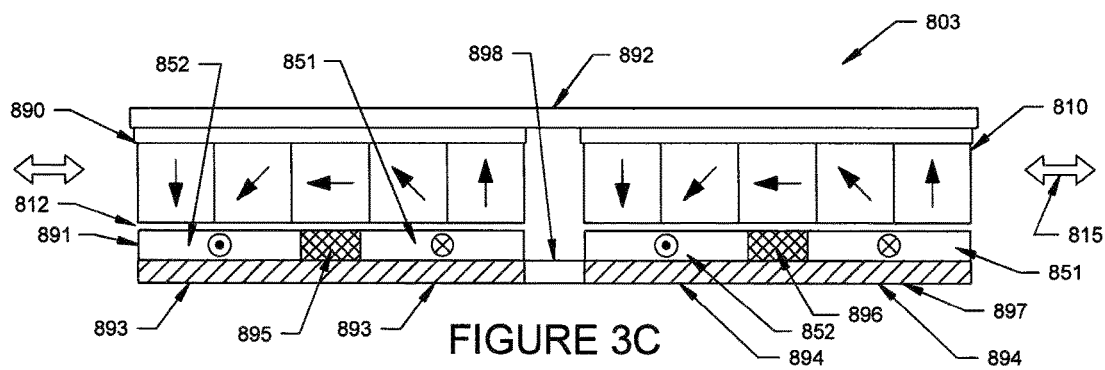

The rotating pattern of permanent magnets (on the front face; on the left, up, right, down) can be replicated, or scaled, as adjacent sections and have the same effect as shown in FIG. 3C. FIG. 3C shows by way of example, a view 803 of two Halbach magnet arrays 810 and 890 connected to a common non-magnetic backing plate 892 that holds each magnet array assembly rigidly together, separated from multiple sets of coil windings 851 and 852 by an air gap 812. The coil windings may be two separate race track windings 891 and 851, or could be one single coil winding that is interleaved to orientate the position and the direction of the coils under each of the appropriate sections of the magnet arrays. The coils may be mounted onto a common backing plate 897 comprising coil center in-field elements 895 and 896 (discussed hereinafter) and back pieces 893 and 894 that are separated by a non magnetic spacer 898. Thus in an extended magnet array configuration, the coil windings may also be replicated and extended (PRA motion is intended to be along axis 815 in sectional view 803). These techniques increase the force capability of the PRA but also increase the complexity size and cost of the actuator.

Referring again to FIG. 3A, the planar coil 811 is typically wound in a "racetrack" configuration. This coil could be freestanding or fabricated against a back piece 850 and separated from a Halbach magnet array 810 with a small air gap 812. FIG. 3B shows a top view 801 of the sectional view 800 shown in FIG. 3A. The planar coil 811 extends beyond the edges of the magnet array 810 as the end-turn windings 860 and 861, are in an orientation that does not contribute to the electromotive action (PRA motion is intended to be along axis 863, and 815 in sectional view 800 and 801). Thus extending the magnet array 810 material over the end turn windings does not improve performance.

To improve the PRA efficiency, the racetrack winding 811 assembly should preferably have a back plate 856 or a center in-field element 853, or a combination of both (856 and 853), as these elements can serve to direct or focus the magnet field produced by the Halbach array and result in a more efficient motor with higher force. The back plate 856 and/or center in-field element 853 can be chosen from a material with high magnetic permeability as this will focus and support the magnetic flux in the linear motor. For example, a ferrous metal (e.g., CRS 1018) can be used for 856 and 853 (which may be a homogonous material), but this implementation yields an undesirable parasitic attractive force in the "Y" 870 direction (shown in FIG. 3A directional axes 872) between the back plate 856 and the in-field element 853, and the magnet array 810. Since desired motion is in the "X" 871 direction, the attractive force acts to increase friction on the moving element mounting (not shown) and therefore act to reduce PRA linear motor movement. Therefore there is a trade-off between the selection of the back plate 856 and in-field element 853 material, material characteristics (permeability), material dimensions and PRA linear actuator performance. Methods of the optimization of the back plate and in-field element materials are a key feature of several embodiments of this invention and are described in detail hereinafter.

It is therefore possible, and sometimes preferable, to completely eliminate the steel plate under the racetrack coil 856. In this case, the PRA will function with lower efficiency, but there will be no parasitic attractive forces, nor will there be any cogging forces. Cogging forces in linear electrical motors are due to the interaction between the permanent magnets and the stator slots of the permanent Magnet (PM) machine. It is also known as detent or 'no-current' torque. Cogging forces are in prior art an undesirable component for the operation of such a linear motor. They are especially prominent at lower speeds, causing motor jerkiness and speed ripple (at higher speeds the motor moment of inertia filters out the effect of cogging forces).

It is one of the objects of this invention to utilize cogging (reluctance) forces in the magnetic circuit to alter the PRA resonance characteristics. This can be achieved by adding a magnetically permeable material such as ferrous steel to the in-field element 853, or the racetrack winding back plate 850, or combinations of both the in-field element 853 and the back plate 850. The ferrous in-field element 853 also has the desirable effect of increasing the efficiency of the PRA. The PRA uses a linear motor configuration to produce reciprocating motion in a motional component. As depicted in FIG. 3A the racetrack winding 811 assembly is the stator and the magnet array 810 is the motional component. In an alternative embodiment, the magnet array 810 may be the stator and the racetrack winding 811 assembly may be the motional component. In either case, magnetically permeable in-field elements 853 and/or back plate 850 may be added to shape and contain the magnetic field in the chosen PRA linear motor configuration.

The thickness and location of the ferrous racetrack in-field element 853 can be varied, as shown in FIGS. 4A-4H, to vary the strength of the effective "magnetic spring" caused by the magnetic reluctance force between the magnetic array and the ferrous racetrack infield. As described hereinbefore, cogging forces exist in any permanent magnet actuator designs that have magnetic circuits utilizing multiple interacting magnets and permeable materials. Therefore these forces are reluctance-based and exist even for conditions of zero winding current. The cogging forces can be modeled using a spring force analogy if the force follows Hooke's law.

FIGS. 4A-4H show various sectional views showing details of various in-field element 853 designs. Each PRA comprises of at least one magnet array 810, separated from two or more coils 811 by an air gap 812. The coils 811 may be mounted on a permeable or non-permeable structure as described hereinbefore. The coil back 905 shown, is the lower surface of the planar coils 811.

Figure 4A:
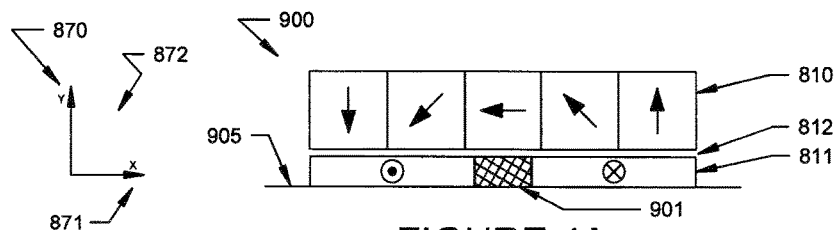
FIGS. 4A-4H show details of the operation of the linear motor components and methods for controlling the performance of the actuator.
Figure 4B:
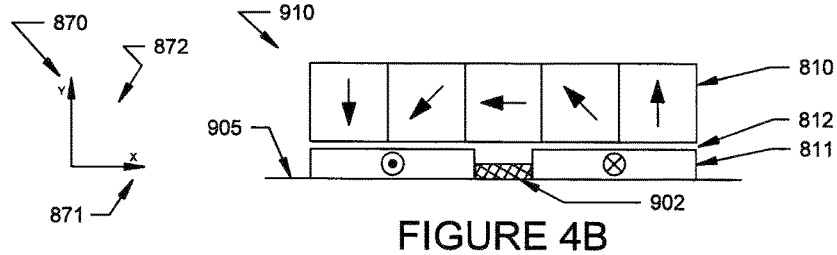
Figure 4C:
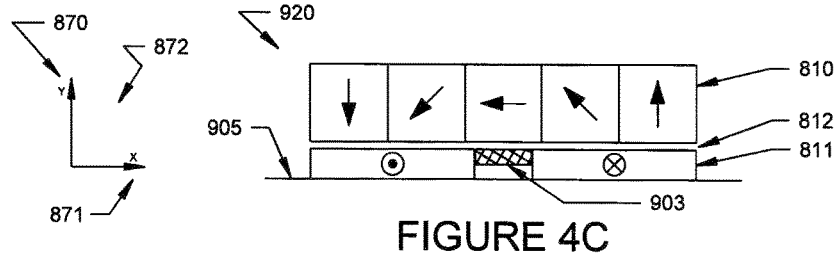
Figure 4D:
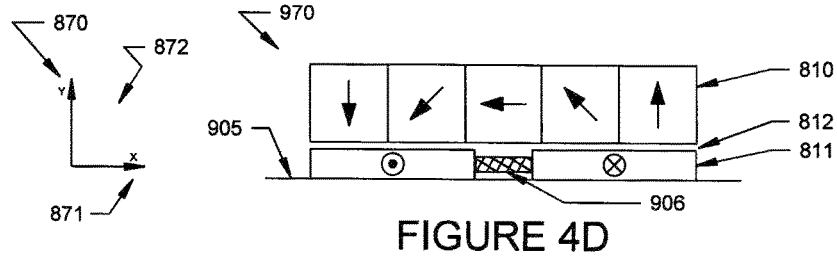
Figure 4E:
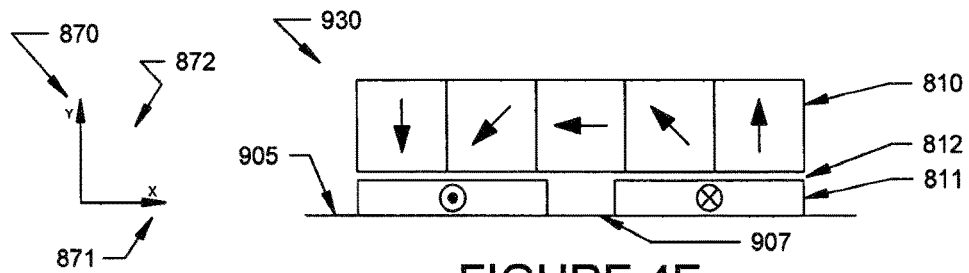

FIG. 4A shows a sectional view 900 of a PRA with a full-height in-field element 901. FIG. 4B shows a sectional view 910 of a PRA with a half-height in-field element 902 located away from the magnet array 810 (i.e. close to the coil 811 back 905). FIG. 4C shows a sectional view 920 of a PRA with a half-height in-field element 903 located close to the magnet array 810 (i.e. away from the coil 811 back 905). FIG. 4D shows a sectional view 970 of a PRA with a half-height in-field element 903 located midway between the coil 811 back 905 and the front of the coil (i.e. centered axially with respect to the coil winding). FIG. 4E shows a sectional view 930 of a PRA without any magnetically permeable in-field element.

Figure 4F:
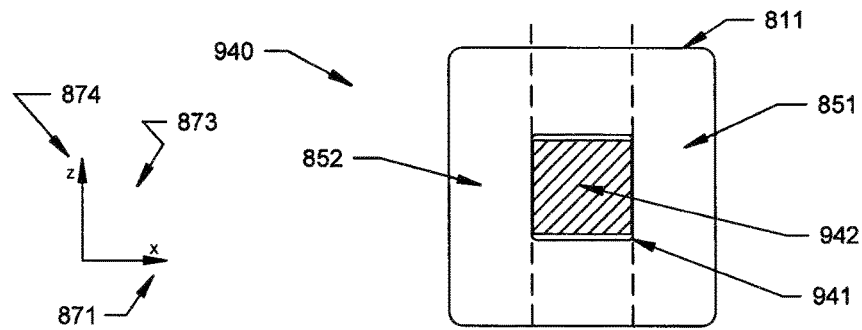
Figure 4G:
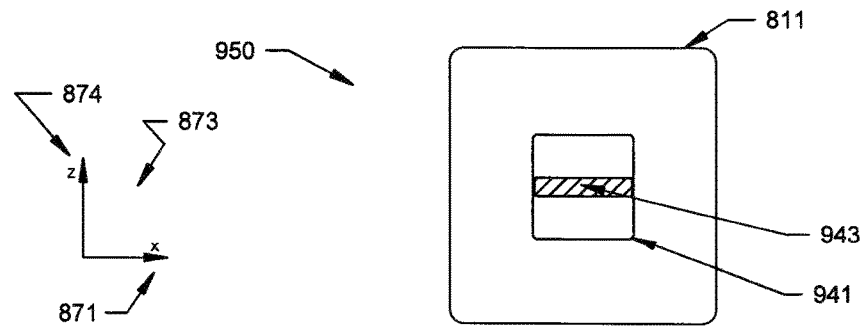
Figure 4H:
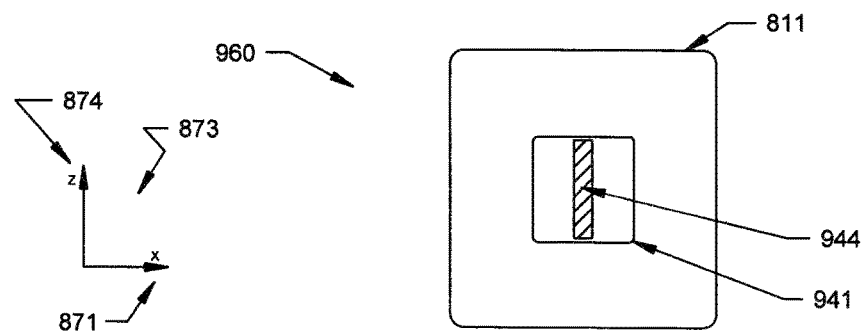

FIGS. 4F, 4G and 4H show top views 940, 950 and 960 of components of the PRA to illustrate aspects of the various in-field element 853 designs. Only a single racetrack coil 811 is shown together with various embodiments of the in-field element (the assembly structure and magnet array of the PRA has been omitted from these views). FIG. 4F shows a top view 940 of a PRA coil with a full-area in-field element 942. In this case the in-field element is located within the full coil in-field 941 area. The PRA motion is intended to be along the axis 871 shown in the coordinate reference 873. FIG. 4G shows a top view 950 of a PRA coil with a reduced-area in-field element 943. The in-field element 943 is located in the center of the coil in-field 941, axially aligned with the direction of actuator motion. FIG. 4H shows a top view 960 of a PRA coil with a reduced-area in-field element 944. The in-field element 944 is located in the center of the coil in-field 941, orthogonal with the direction of actuator motion.

The in-field element height may be specified in terms of the coil 811 height; for example, a full height in-field element would extend from the coil back 905 to front of the coil 811 (start of the air gap 812) as configured in 901. The position of the center of the in-field element can also be specified in terms of the coil dimensions; for example the coil back 905, coil front and midpoint of the coil 811 height. The in-field element may in some embodiments also be constructed with a height that larger than the coil height.

Figure 5:
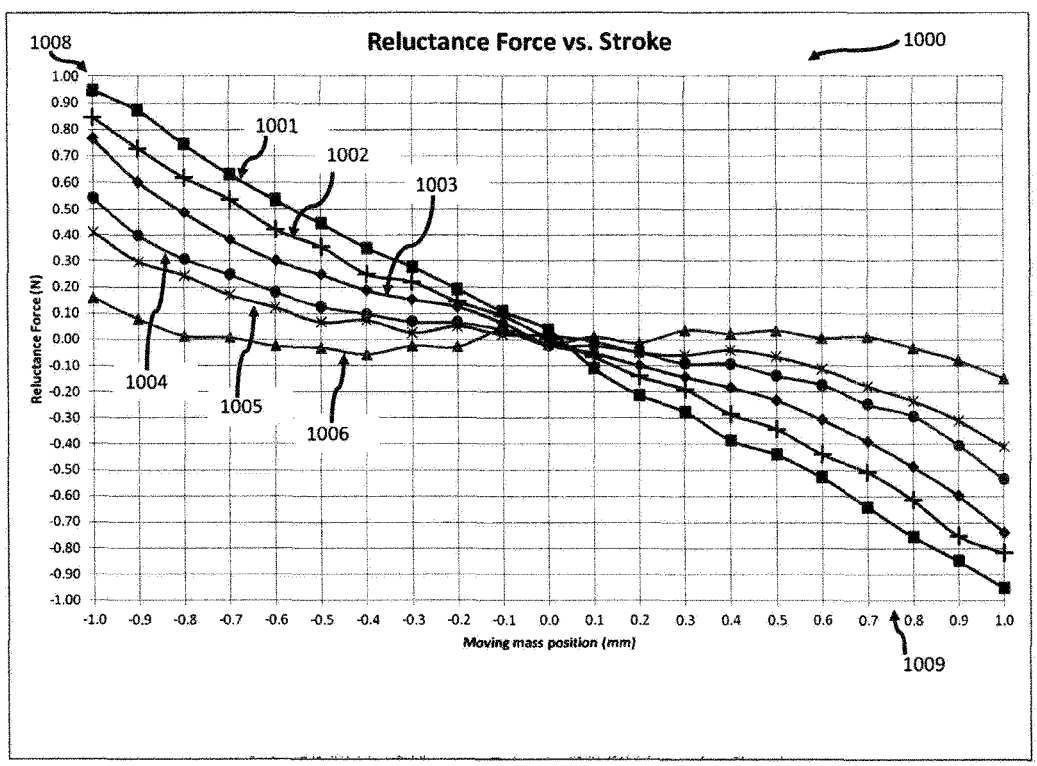
FIG. 5 shows the simulated results of various configurations further illustrating methods for controlling the performance of the actuator.

FIG. 5 shows a graph 1000 of the results of a finite element simulation for a PRA configuration showing the effect of various in-field elements on the reluctance force 1008 as a function of moving element position 1009. The configuration simulated was designed to fit within a 20×20×5 mm form factor and used a five segment (each comprising of N52 material, 11×4×2.5 mm elements) Halbach magnet array and a 20×20×2.2 mm racetrack winding with a 10×10×2.2 mm in-field. The in-field element was CRS 1018 ferrous metal.

Plot 1001 is shown for a half height in-field element positioned against the coil base. Plot 1002 is shown for a half height in-field element positioned midway between the coil front and back. Plot 1003 is shown for the full height in-field element configuration. Plot 1004 is shown for a three-quarter height in-field element positioned against the coil front. Plot 1005 is shown for a two-thirds height in-field element positioned at the coil front. Plot 1006 is shown for a half height in-field element positioned at the coil front.

The slope of the reluctance vs. position plots is approximately linear (over small displacements) and represents the magnetic spring characteristics for the system. The magnetic spring characteristics can be controlled by the in-field element height and position within the coil in-field. Therefore the stiffness of the PRA can also be controlled by these methods. The overall PRA suspension stiffness may in some embodiments also controlled by additional mechanical springs that will combine with the magnetic spring to form an overall spring effect.

Figure 6:
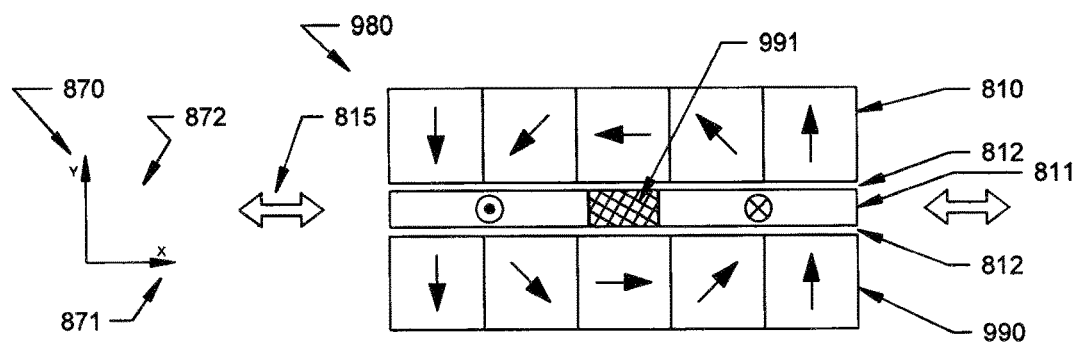
FIG. 6 shows an alternate embodiment of a high performance PRA utilizing multiple magnet arrays in a sandwich configuration.

FIG. 6 shows a sectional view 980 of another embodiment of this invention that utilizes two magnet arrays 810 and 990 in a balanced sandwich configuration. The planar coil 811 is located between said magnet arrays, separated by air gaps 812 on each side of the coil. This configuration is shown only for a single set of coils and magnet arrays but can as described hereinbefore, be readily extended and scale to multiple adjacent magnets and coils thereby constructing an actuator with increase force and displacement capability.

An advantage of this balanced configuration is the strong and uniform magnetic field between the magnet array elements. There is no need to shape the magnetic field using backing plate ferrous materials as the magnetic field may be shaped using the magnetic arrays directly. This approach thus avoids the significant parasitic attractive forces that may occur between the coil and any backing plates. A Halbach configuration with magnet arrays 810 and 990 orientated as shown in 980 is a preferred configuration as this arrangement will reinforce and focus the magnetic field (in the coils and air gap) resulting in improved electromotive performance. There are significant forces between the magnet arrays 810 and 890 that will require a mechanical assembly or fixture (not shown in the figure). Suitable fixture means may include mechanical frames, fixtures, epoxy potting and the like. As described hereinbefore, various sizes and shapes of in-field element 991 containing a magnetically permeable material may be used to control the PRA reluctance force vs. displacement, and therefore the PRA response. This configuration can also be used without an in-field element 991. This embodiment of the invention shown in sectional view 980 can be configured with either the coil 811 as the motional component and the magnet arrays (810 and 990) as the stator, or magnet arrays 810 and 990 as the motional components and the coil 811 as the stator, depending on the application.

Figure 7:
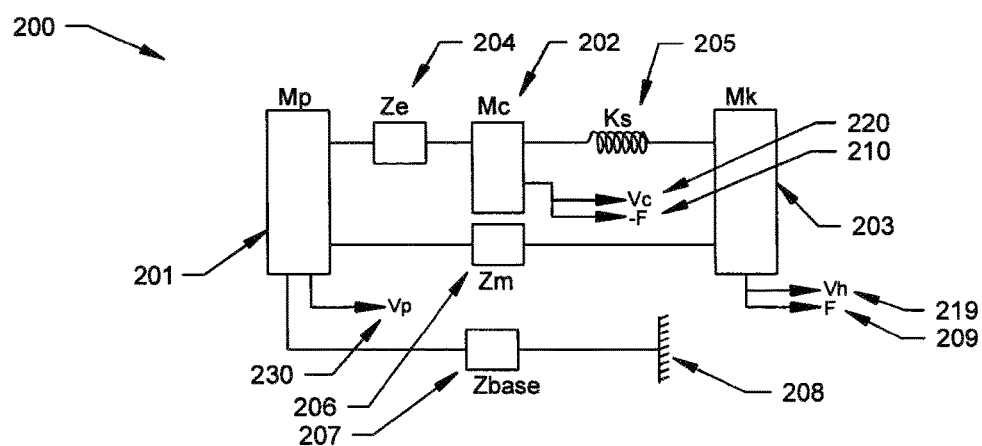
FIG. 7 shows the motional equivalent circuit model for the PRA.

FIG. 7 shows the lumped mechanical equivalent acoustic circuit or "free body" diagram 200 for the wearable device 101 and internal PRA component 103 (FIG. 2). The wearable device 101 has an associated mass Mp 201 connected via impedance Ze 204 to a stator mass 202 in turn connected to a moving mass Mh 203 through a spring Ks 205. The spring Ks 215 may comprise of mechanical and magnetic components and for the purposes of this analysis is lumped (combinational) into a single parameter. The moving mass Mh 203 is also connected to the device mass 201 via an impedance Zm 206. The electromotive force generated in the linear motor results in forces F (210) and −F (209) between the stator 202 and moving mass 203 motor components. Similarly, the forces results in velocities Vc (220) and Vh (219). The velocity of the device Vp (230) will then be from a combination of the mechanical components and the linear motor actuation. Impedance elements 204 and 206 may in some embodiments be simplified (combining Mc 202 and Mp 201 to eliminate Ze 204, and eliminating Zm 206).

The system includes components well known in mass-spring, force actuator systems where the ratio of the moving mass Mc 202, and the spring constant Ks 205 are used to determine the square of the resonance frequency (for the actuator operating in the absence of loading such as the contactor moving freely in air). In some embodiments, the coupling mass Mc 202 may be directly (i.e. rigidly) connected to the device mass Mp 201, which would also imply that the stator velocity Vc would be the same as the device velocity Vp.

The PRA linear motor acts with a force 209 on the moving mass Mh 203 and also produces a reaction force 210 onto the mechanical coupling mass Mc 202. The linear motor is the actuator or force-driver for the system. The mechanical coupling mass 202 acts upon the device mass Mp 201. In some embodiments an additional impedance Zm 206 may be used between the device mass Mp 201 and the moving mass 203. The user is usually holding the device and therefore will be in contact with the device mass 201. The user skin (body) or body load is represented by the lumped mechanical impedance Zbase 207 and the complete system is reference to an earth ground 208.

Numerical values for the skin (body) impedance components can be found in E. K. Franke, Mechanical Impedance Measurements of the Human Body Surface, Air Force Technical Report No. 6469, Wright-Patterson Air Force Base, Dayton, Ohio, and T. J. Moore, et al, Measurement of Specific Mechanical Impedance of the Skin, J. Acoust. Soc. Am., Vol. 52, No. 2 (Part 2), 1972. These references show that skin (body) tissue has the mechanical input impedance of a fluid-like inertial mass, a spring-like restoring force and a viscous frictional resistance. The numerical magnitude of each component in the skin (body) impedance depends on the contact area and, as can be expected, the resistive loading of the skin (body) is shown to increase with increasing contact area.

The system of masses and mechanical interconnections makes up a multiple resonant system. The masses 201, 202 and 203 can be chosen together with the spring 205 compliance, possible loading impedances Ze 204 and Zm 206 to achieve desired operating characteristics (including resonance). This frequency may be the operating frequency for maximum contactor displacement, or some other selected frequency to shape the overall transducer vibration response over a wider bandwidth (as described hereinafter). It is desirable to maximize the device velocity Vp 211 whilst simultaneously minimizing the mass and size of the PRA components. The equations of motion for this mechanical circuit can be solved using well known electro-acoustic analogous circuit design techniques. Analysis of this system of equations is usually by direct mathematical analysis or using a computer-based equation solver.

If the goal is to maximize the haptic and vibratory effect (for an actuator with a given total mass, force and form factor), analysis shows that it is advantageous in the PRA to have as high moving mass as is possible (assuming the sum of the moving mass and the stator add up to the PRA total mass). The most effective use of the PRA (in terms of haptic or tactile output) is to have as high a moving mass as possible as this will increase the force transmitted to the device housing and body load. This is counter intuitive as conventional design approaches would teach to minimize the moving mass and simplify the mounting and bearing requirements. However, increasing the moving mass has limitations as adding too much mass the actuator will deleteriously affect the wearable device usability and complicates the design of mechanical bearings, springs and suspension elements. It is preferable for PRA applications using a moving mass internal to the wearable device, to utilize the heaviest component of the PRA linear motor as the moving element. Depending on the PRA design, the magnetic array components will be much heavier than the coil and should therefore be used as the moving mass.

Figure 8:
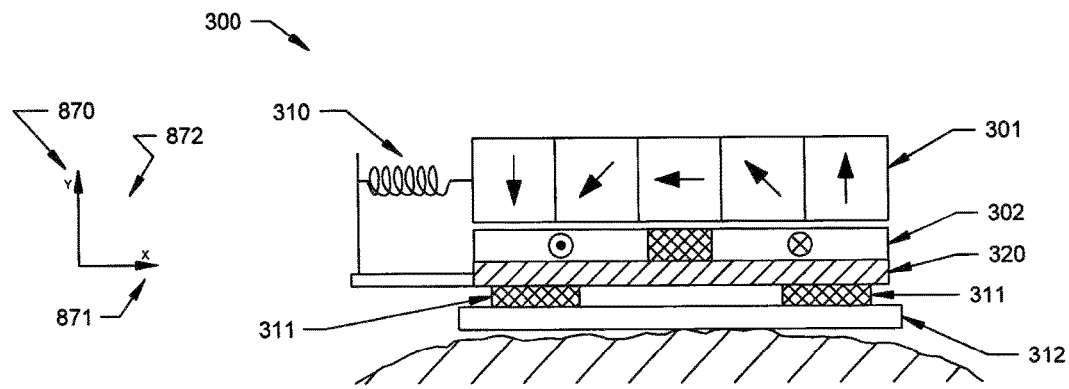
FIG. 8 shows the further details of the PRA configuration.

Further aspects of the PRA are shown in the sectional view 300 in FIG. 8. The PRA comprises of a magnetic array 301, preferably a Halbach array as described hereinbefore, that is suspended via a mechanical spring 310 such that it interacts with the field produced by stationary stator coil 302, attached to the wearable device housing 312 via mounts 311 and back piece 320. When an electrical current is applied to coils 302, the magnet array 301 will move perpendicularly to the fixed coils in the housing, acting against one or more compliant spring 310 elements. The magnet array 301 therefore moves along the axis 871 as shown in the coordinate reference 872. The orientation and movement of the magnetic array 301 may be controlled by a spring with a high compliance in the direct of intended motion and a low compliance in the orthogonal directions. Alternately, linear bearings and guides may be used to hold the orientation of the element and control the movement in the intended directions.

With the correct spacing of magnets and coils, and the appropriate current waveform, the stator can be made to oscillate. The oscillation can be constrained to an area of maximum flux density and the cogging effect can be used to decelerate (and provide damping) the moving mass at the end of each excursion. The compliant element 310 (for example a leaf spring) serves to center and constrain the moving mass and potentially set a desired resonant frequency. Because of the limited displacement and the reciprocating nature of the motion, this invention provides a means for efficient actuation and oscillation within a very small volume.

Figure 9:
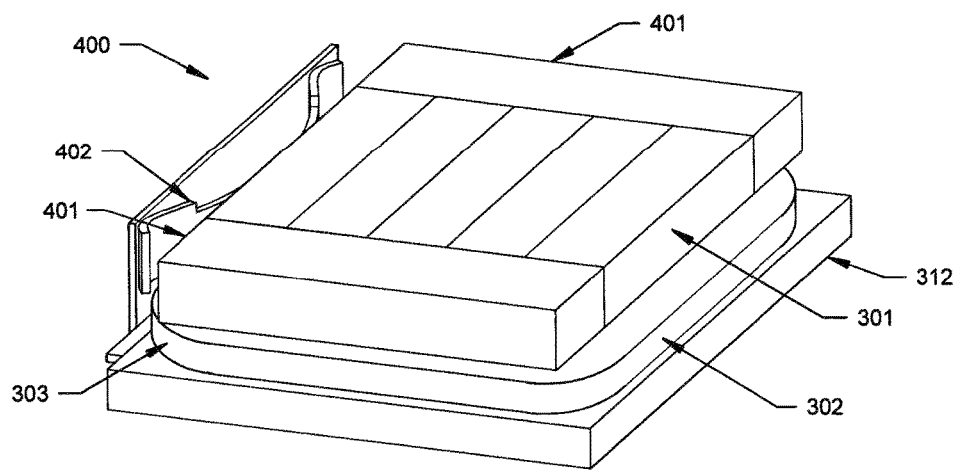
FIG. 9 shows an approach for adding mass to a moving magnet PRA configuration.

FIG. 9 shows an isomeric view 400 showing further details of the PRA. The coil winding 302 is a racetrack winding (i.e. a circular track with parallel sections within the magnetic field). Typically the windings must have rounded ends 303.

A particular feature for another embodiment of the PRA, shown in this figure, are elements 401 which are attached to the ends of the magnet array 301. These elements 401 are typically chosen to be made from a high density material such as Tungsten and provide additional mass to the moving mass element 203 (FIG. 7). The elements are attached to the ends of the magnetic circuit and are magnetically isolated from the linear motor. Adding mass to the moving mass element (magnet array 301) increases the overall weight of the PRA and the wearable device, but as has been described hereinbefore, can improve the haptic and tactile performance of the PRA and the effectiveness of the wearable device to transmit tactile and haptic stimuli to the user.

As described previously, a spring 402, for example a leaf spring may be used to provide compliance between the moving mass element 203 and the wearable device 312. Other designs envisioned include coil springs, rubber springs, cantilever springs and the like. As described previously, the spring is designed to be mechanically resonant within the operating frequency of the PRA, thereby utilizing the energy storage of the spring to increase the moving mass velocity and the displacement.

Figure 10A:
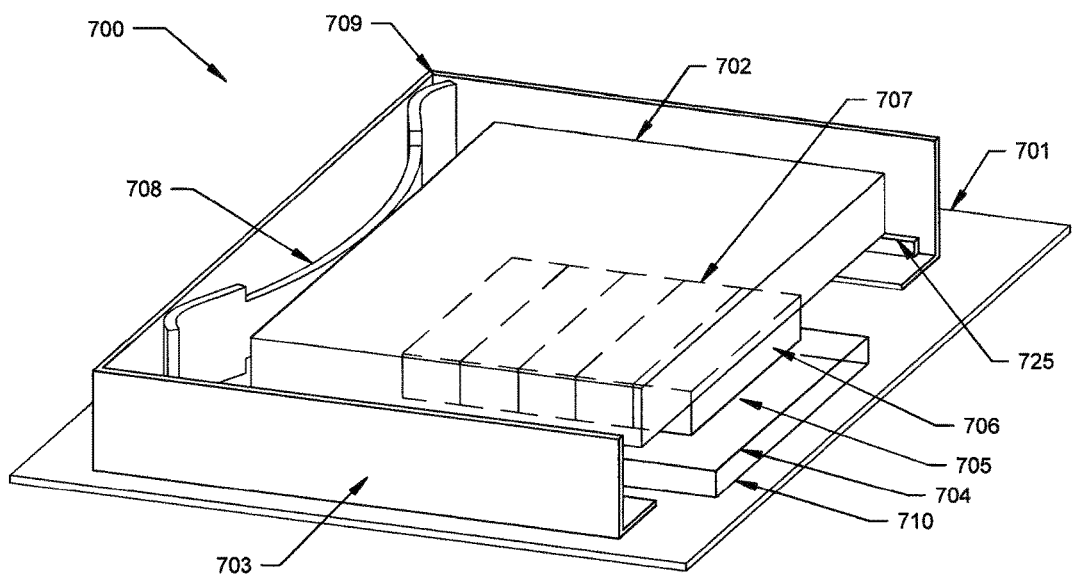
FIGS. 10A-10B show an approach for using existing components in a wearable device as part of the mass components for the PRA.
Figure 10B:
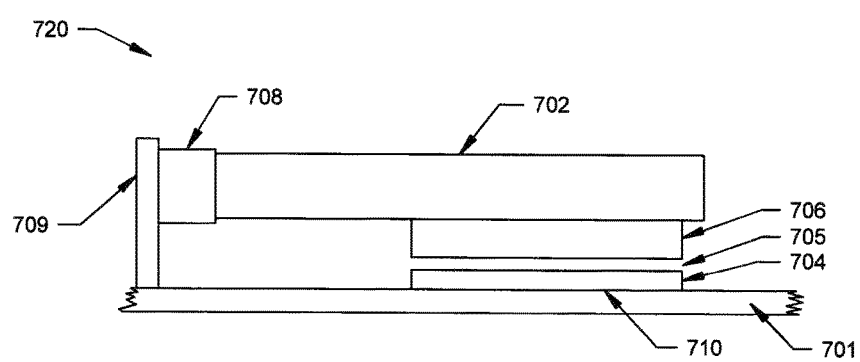

FIG. 10A shows an isometric view 700 and FIG. 10B a side sectional view 720 of further aspects and embodiments of this invention. As described hereinbefore, it is advantageous to increase the moving mass in the PRA. However, it may be desirable to still keep the overall mass of the wearable device 101 low. Thus adding mass to the PRA (not associated with the magnetic components) acts to increase the overall wearable device mass and may be undesirable. Therefore, this embodiment of the invention utilizes other existing high mass components of the device, by connecting said high mass components to the moving mass of the PRA. The high mass components must be identified during the design of the wearable device and the design of both the device and the PRA must be integrative of function.

For example, the wearable device may contain an internal battery, or similar high-mass component 702, that in this embodiment of the invention, is rigidly attached to the PRA linear motor 710 moving mass 706. The high mass component of the device 702 can be positioned using guides 703 and/or compliant springs 708 and/or linear bearings 725 such that it is able to oscillate together with the moving mass 706. The guides and springs are then attached to the structure of the device 701 using mounts (for example 709).

As described previously, various linear motor configurations can be used in the PRA. For example, a magnetic array 707 may be used as the moving component positioned adjacent to one or more coils in a stator 704. As described previously, a small air gap 705 separates the stator 704 and moving mass 706 linear motor components. The stator 704 is typically connected to the device structure 701. Therefore, during operation, the PRA moves the high mass component 702 of the wearable device relative to the structure of the device 701, thereby imparting a haptic or tactile stimulus to the user (who is in contact with the device).

In some embodiments, additional compliant elements may be used to connect to the stator and moving mass components. In other envisioned embodiments other geometric configurations can be used to connect the component of the device 702 to alternate linear motors arrangements and resonant components. For example the linear motor may attach to the additional component of the device 702 along one edge. Further, it may be possible to use a completely free floating additional device component 702, or one that has one or more sides attached to the structure (thereby limiting the available moving mass for the PRA).

Figure 11:
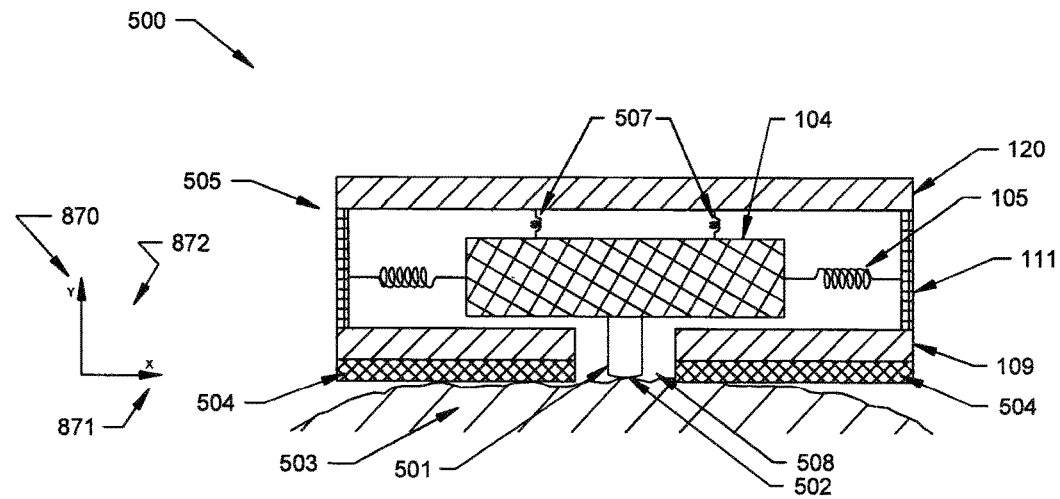
FIG. 11 shows an alternate embodiment using the PRA as a sweeper or shear wave actuator.

FIG. 11 shows a view 500 of another alternate embodiment of a PRA configured as a wearable "sweeper" actuator 505. This configuration is intended to be worn, or positioned against the body of the user, such that contactor 501 is in contact with the user as well as the actuator housing 504. The contactor 501 protrudes through an opening or slot 508 in the housing 504 (and also in the center of stator 109). The is approach offers an alternate method for imparting vibration into the body of a user 503 and is similar to tactile actuator configurations taught in U.S. Pat. Nos. 7,798,982 B2 and 8,040,223 B2.

The contactor 501 should preferably positioned with a force against the skin, to preload the contactor contacting face 502 against the compliance of the body or skin. In some embodiments, said force may be created using positioning compliances 507 that are chosen together with the contactor dimensions to optimally preload the skin. The contactor 501 and contacting face 502 is moved laterally (i.e. in shear) under the action of one or more PRA linear motor actuators to convey a localized tactile or haptic sensation.

The shear movements may results in lateral displacements with various characteristics. For example, oscillatory, impulsive, ramps or tone bursts can be used to create various haptic sensory effects for the user. The contactor 501 is attached to the PRA moving mass 104, and is also in contact with the body of the user 503. The contacting face 502 of the contactor 501 should preferably be rounded. The PRA 103 comprises of a moving mass 104, support spring guides 105 that may be resonant with said moving mass. End mounts 111 may also be used to control the response of the moving mass 104 and its interaction with the device wall 101 or structure. For example, mounts 111 may comprise of rubber or silicon pads that act to dampen the actuator movements (at the edges of the displacement excursions). The PRA comprises of a motional component 104 and at least one stator 109. In some embodiments two stator components 109 and 120 may be positioned on each side of the motional component in a "sandwich" construction. In each embodiment, the motional components and stator components contain magnetic circuit components for use as a linear motor. As described hereinbefore, the PRA can be design with either a coil or the magnet array as the motional component.

Actuator 505 therefore comprises of a linear motor that under appropriate electrical drive will result in the linear or sweeping motion of the contactor 501 over the surface of the user's body 503. The direction of the sweep will be determined by the linear motor components in the PRA. For the actuator shown, the movement will be predominantly along axis 871 as shown by the coordinates 872. The area and heights of the actuator 505 housing 504 and contacting face 502 are chosen such that the skin in contact with the contactor 502 is manipulated in shear thereby imparting a tactile stimulus to the user.

Figure 12:
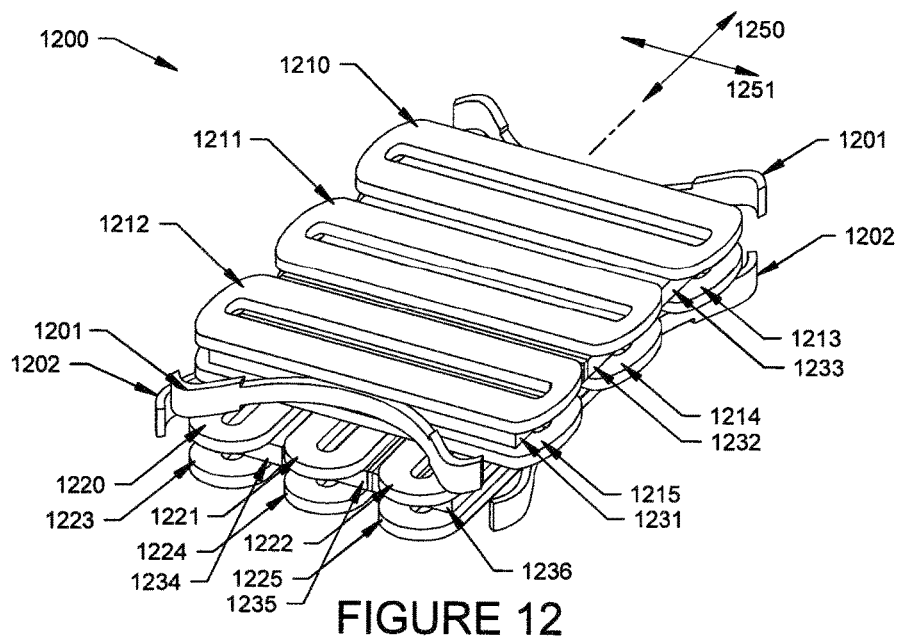
FIG. 12 shows and alternate embodiment using multiple PRA actuators mounted orthogonally to produce various haptic effects based on shape.

FIG. 12 shows a view 1200 of aspects of another alternate embodiment that uses two orthogonal PRA actuators (a top PRA and a lower PRA). In the configuration shown there are three coils 1210, 1211 and 1212 on the top surface of the "top" PRA with three matching coils 1213, 1214 and 1215 on the lower surface of the "top" PRA. Three magnet arrays 1233, 1232 and 1231 are mounted on end springs 1201. The "top" PRA would therefore operate as described hereinbefore, displacing along axis 1250.

Similarly, there are three coils 1220, 1221 and 1222 on the top surface of a "lower" PRA with three matching coils 1223, 1224 and 1225 on the lower surface of the "lower" PRA. Three magnet arrays 1234, 1235 and 1236 are mounted on end springs 1202. The "lower" PRA would therefore operate as described hereinbefore, displacing along axis 1251.

The actuators can be used to drive a single contactor over the surface of a user's skin. These actuators can be driven independently or used in combination to present various types of tactile stimuli to the body of the user. For example, the PRA actuators may be driven to create various lateral shear displacements where the direction of shear may be used to convey specific haptic sensations. Other examples may include generating more complex two dimensional shapes such as circles, squares or triangles; in effect, "drawing" on the skin.

In a similar embodiment, this configuration may also be used within a wearable device in a moving mass shaker configuration to impart a haptic or tactile effect onto the skin or body of a user.

As described hereinbefore, the PRA can be implemented in many different configurations. A minimal configuration would be a single coil and a single magnet array where either the coil or the magnet array is designed to be the moving element. At the other extreme, multiple magnets and coils could also be laid out adjacent to one another to achieve the PRA design. In all cases the magnets and coils would be configured such that when a current is passed through the coil, it would interact with the permanent magnetic field in accordance with well known Maxwell-Faraday's laws, to produce relative motion between the magnet(s) and coil(s), i.e. acts as a linear motor. The optimal configuration is one in which number and placement of magnets and coils within size and weight constraints, results in the most efficient electromagnetic coupling.

The present invention provides a planar reciprocating actuator (PRA) which is intended to be used in vibrotactile and haptic applications. Preferably the moving mass of the PRA may be part of the linear motor and may in some embodiments, also include part of the wearable or hand-held device components. The PRA moving mass is constrained to move primarily in a linear trajectory with a guiding mechanism that may also comprise of springs and damping elements that are used to control the mechanical resonance and response characteristics of the actuator.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. Therefore, the above description and illustrations should not be construed as limiting the scope of the invention, which is defined by the appended claims.

What is claimed as invention is:

1. A planar reciprocating actuator comprising:
   a housing;
   a motional component comprising at least one linear magnet array in said housing attached to said housing by at least one spring, and
   a stator component parallel to and separated from said motional component by an air gap, said stator component comprising at least one planar coil racetrack winding and
   an in-field magnetically permeable element located substantially in the center of and substantially coplanar with said planar coil racetrack winding and constituting the only magnetically permeable component in said stator component, wherein when an alternating current is passed through said planar coil racetrack winding, said planar coil racetrack winding and said in-field magnetically permeable element interact with said magnet array to produce relative reciprocating motion of said motional component to generate a vibrotactile stimulus to a user.

2. The planar reciprocating actuator of claim 1 wherein said motional component comprises two linear magnet arrays in a balanced configuration on each side of said stator.

3. The planar reciprocating actuator of claim 1 wherein the mass of said motional component is mechanically resonant with said at least one spring.

4. The planar reciprocating actuator of claim 1 wherein said actuator is constrained to move primarily in a linear trajectory.

5. The planar reciprocating actuator of claim 1 wherein said actuator oscillates at a frequency of 30 to 300 Hz.

6. The planar reciprocating actuator of claim 1 wherein said motional component comprises a Halbach magnetic array.

7. The planar reciprocating actuator of claim 1 wherein said motional component is rigidly attached to a battery.

8. The planar reciprocating actuator of claim 1 wherein said motional component includes a contactor generating shear displacement tactile sensation to the body of a user.

9. A planar reciprocating actuator comprising:
   a housing;
   a motional component comprising at least one planar coil racetrack winding and
   an in-field magnetically permeable element located substantially in the center of and substantially coplanar with said planar coil racetrack winding and constituting the only magnetically permeable component in said motional component, said motional component attached to said housing by at least one spring; and
   a stator component parallel to and separated from said motional component by an air gap, said stator component comprising at least one magnet array, wherein when an alternating current is passed through said planar coil racetrack winding, said planar coil racetrack winding and said in-field magnetically permeable element interacts with said magnet array to produce relative reciprocating motion of said motional component to generate a vibrotactile stimulus to a user.

10. The planar reciprocating actuator of claim 9 wherein said stator comprises two linear magnet arrays in a balanced configuration on each side of said motional component.

11. The planar reciprocating actuator of claim 9 wherein the mass of said motional component is mechanically resonant with said at least one spring.

12. The planar reciprocating actuator of claim 9 wherein said actuator is constrained to move primarily in a linear trajectory.

13. The planar reciprocating actuator of claim 9 wherein said actuator oscillates at a frequency of 30 to 300 Hz.

14. The planar reciprocating actuator of claim 9 wherein said actuator comprises a Halbach magnetic array.

15. The planar reciprocating actuator of claim 9 wherein said motional component is rigidly attached to a battery.

16. The planar reciprocating actuator of claim 9 wherein said motional component includes a contactor generating shear displacement tactile sensation to the body of a user.

17. The planar reciprocating actuator of claim 1 including a bearing to position said motional component.

18. The planar reciprocating actuator of claim 1 wherein said in-field magnetically permeable element acts as a magnetic compliance and is used to set the resonance frequency.

19. The planar reciprocating actuator of claim 9 including a bearing to position said motional component.

20. The planar reciprocating actuator of claim 9 wherein said in-field magnetically permeable element acts as a magnetic compliance and is used to set the resonance frequency.

\* \* \* \* \*